Feb. 15, 1938.  H. C. DRAKE ET AL  2,108,580
LUBRICANT TESTING DEVICE
Filed July 10, 1935
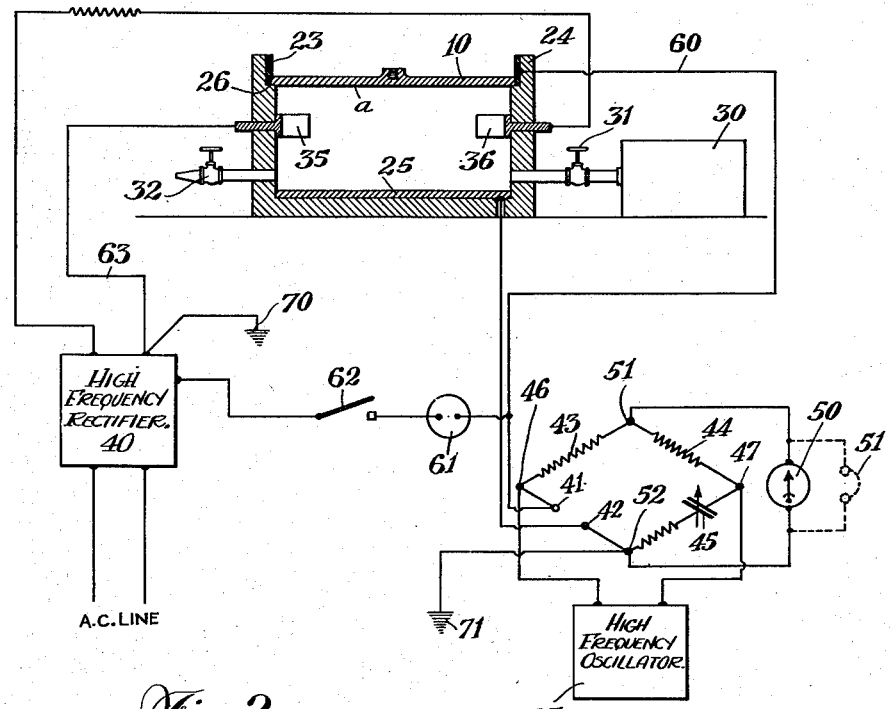
INVENTORS
HARCOURT C. DRAKE & LOREN J. DE LANTY
BY
Joseph H. Lipschutz
ATTORNEY Patented Feb. 15, 1938

2,108,580

UNITED STATES PATENT OFFICE

2,108,580

LUBRICANT TESTING DEVICE

Harcourt C. Drake, Hempstead, and Loren J. De Lanty, Brooklyn, N. Y., assignors to Sperry Products, Inc., Brooklyn, N. Y., a corporation of New York Application July 10, 1935, Serial No. 30,640

6 Claims. (Cl. 175—183)

This invention relates to a method of and means for testing lubricants for determining their lubricating values and for giving a direct reading indication of said values. It is now quite well known that the lubricating value of a lubricant depends upon its ability to adhere to the surface of the metal it is lubricating. This quality of adhesiveness has heretofore been measured by devices which depended upon centrifugal force. Said devices usually take the form of a metal band on the periphery of which the oil was applied and the said band was then mounted upon a rotor and rotated at high speeds on the order of 10,000 to 15,000 revolutions per minute. The large centrifugal forces thus developed tended to tear the molecules of oil from the surface of the metal upon which they were applied and the amount of oil remaining after a given period of rotation was an index of the adhesiveness of the lubricant.

The said method of testing required extensive and complicated apparatus which included high speed rotating mechanism, chemical balances for weighing the ring with the oil before and after rotating, and consumed a substantial time during which it was necessary to keep the temperature constant and provide other means for preventing variable factors from entering.

It is the principal object of our invention to provide a simplified and more rapidly acting type of device for removing the excess oil and also to provide a simple, rapidly acting, direct reading meter for determining the amount of oil which remains in adhesive relation after the test.

Further objects and advantages of this invention will become apparent in the following detailed description thereof.

In the accompanying drawing,

Fig. 1 is a vertical section of a type of mechanism embodying our invention.

Fig. 2 is in part a vertical section and in part a wiring diagram illustrating a form of direct reading meter.

Referring to the drawing, it will be apparent that we contemplate a form of adhesive determining mechanism which depends not upon centrifugal force but upon vibration. For this purpose, the oil is applied to the surface $a$ of a plate 10 which is then attached in any suitable manner, as by screw 11, to an armature 12 which is supported by spring fingers 13 from the ring pole 14 of an electro-magnet which may be of the loud speaker type. Said magnet includes in addition to the ring pole 14 a central pole 15 and magnetizing coil 16 which may be energized from any suitable source of current such as battery B.

Cooperating with the armature 12 and the center pole 15 there is a coil 17 wound around the outer end of said pole 15 just back of the armature 12, and through said coil there is passed a high frequency A. C. supply from any suitable oscillator which may be the quartz crystal oscillator indicated generally at 22 and consisting of the tube 21 feeding back through crystal 20. This type of oscillator is well known and will produce a high frequency oscillation of the armature 12 and hence of the plate 10. The inertia of the film of oil which has been applied to surface $a$ of plate 10 will cause said oil to lag behind the movements of plate 10 and thus cause the more loosely held particles to be thrown off so that after a predetermined period of oscillation at a given frequency of oscillation there will remain upon the surface $a$ of plate 10 a film of oil which is adhesively held, and the thickness of the film, which is a function of the weight of the oil remaining on the plate, will be an index of the adhesiveness of the lubricant tested.

As described in the introduction, it has heretofore been the practice to weigh the lubricant-carrying member, which has been in the form of a band, before and after subjecting the same to the tests; but since the metal band is a relatively large weight factor compared to the weight of the oil thereon, it was difficult to obtain a high degree of accuracy and in addition it required a weighing process which consumed considerable time. It is therefore one of the objects of our invention to provide means for obtaining a quick and direct reading of the thickness of the oil film remaining upon plate $a$.

For obtaining a direct reading of the thickness of film remaining after the revolution, we have provided a meter mechanism which is made possible by the fact that the testing member carrying the lubricant to be tested is in the form of a plate 10 and the lubricant under test is applied to one face of said plate. Such construction of the testing plate and application of the lubricant thereto makes it possible for us to employ said plate and the film of oil carried thereby as one plate and the dielectric, respectively, of a condenser. Thus, referring to Fig. 2, we have provided a casing 24 having in the bottom thereof a plate 25 and having a shoulder 26 near the upper end thereof upon which the plate 10 may rest with the face $a$ downwardly in the direction of plate 25. In this position, plate 10 contacts with a band 23 in the wall of casing 24 which is in electrical engagement with the source of high frequency alternating current such as a high frequency oscillator 27, the said circuit also extending to plate 25. The space between the surface $a$ of plate 10 and plate 25 is intended to be filled with an inert gas such as neon, helium, or argon, supplied from a pressure tank 30 through valve 31 to the interior of casing 24. The gas is fed in from the pressure tank while a vent 32 remains open until only the inert gas is contained within tank 24, whereupon the vent 32 is closed, and after sufficient gas has been supplied to the interior of tank 24 the supply valve 31 is also closed. There is thus formed a condenser comprising the plate 10 on the one hand, the plate 25 and the gas on the other hand, and the film of oil on surface $a$ as the dielectric. It is necessary to render the inert gas conductive and this is done by supplying current to electrodes 35, 36 from any suitable source as, for instance, from an A. C. line through a high voltage rectifier 40 and thus to the electrodes 35 and 36.

In order to measure the capacity of the condenser thus formed, and therefore in order to measure the thickness of the film on surface $a$, since all the other factors are constant, the said plates 10 and 25 are connected into one leg of a Wheatstone bridge at points 41, 42, the other legs of which are composed of standard resistances 43 and 44 and the variable condenser 45. The high frequency current from source 27 is connected to the Wheatstone bridge at points 46, 47. The variable condenser 45 is adjusted until the meter 50 or the ear phones 51 disclose that no current is passing between the diagonal points 51 and 52 of the Wheatstone bridge. When this condition occurs, the setting of the dial of variable condenser 45 gives a direct reading of the capacitance of the condenser and therefore a direct reading of the thickness of the oil film and hence of the weight of oil remaining on the plate 10 after vibration.

It is necessary that the film of oil completely cover the face $a$ of plate 10 and in order to test for this condition there is provided a branch circuit extending from plate 10, conductor 60, high resistance ammeter 61, switch 62, which is closed when the test is to be made, and conductor 63 to the electrode 35, thence through the gas to plate 10. If the film of oil on surface $a$ is not complete there will be a relatively large current passing through ammeter 61, whereas if the oil film is complete, in other words, if the dielectric is complete, relatively little current will pass through meter 61. In this way, by merely closing switch 62, a test may be made prior to measurement by condenser 45 of the effectiveness of the oil film on surface $a$.

In order that a variable electro-static factor shall not be introduced we provide means for grounding the A. C. supply through rectifier 40 at point 70 and also grounding high frequency oscillator supply 27 by connecting point 52 to ground at point 71.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described some of these may be altered and others omitted without interfering with the more general results outlined, and the invention extends to such use.

Having described our invention, what we claim and desire to secure by Letters Patent is:

1. The method of testing a lubricant which consists in applying the lubricant to a plate, vibrating said plate at a predetermined frequency, and determining the residue of lubricant remaining on said plate after vibration.

2. The method of testing a lubricant which consists in applying the lubricant to a face of a plate, vibrating said plate at a predetermined frequency, and determining the residue of lubricant remaining on said plate after vibration.

3. The method of testing a lubricant which consists in applying the lubricant to the lower face of a plate, vibrating said plate at a predetermined frequency, and determining the residue of lubricant remaining on said plate after vibration.

4. The method of testing a lubricant which consists in applying the lubricant to a plate, vibrating said plate at a predetermined frequency, forming a condenser with the lubricant on said plate as the dielectric, and measuring the capacity of said condenser.

5. The method of testing a lubricant which consists in applying the lubricant to a plate, vibrating said plate at a predetermined frequency, forming a condenser consisting of said plate, a second plate, and the lubricant on said first plate as the dielectric, and measuring the capacity of said condenser.

6. A device for measuring the thickness of a non-conducting film on a face of a plate, said device comprising a housing having a plate therein, means for supporting said first plate in said housing spaced from said second plate and with the film facing said second plate, a supply of gas for the space between said plates, means for rendering said gas conductive, whereby a condenser is formed by said plates, film and gas, said film being the dielectric, and means for measuring the capacity of said condenser.

HARCOURT C. DRAKE.
LOREN J. DE LANTY.